United States Patent [19]

Callen et al.

[11] Patent Number: 5,038,266
[45] Date of Patent: Aug. 6, 1991

[54] HIGH EFFICIENCY, REGULATED DC SUPPLY

[75] Inventors: Patrick J. Callen; John D. Bingley, both of Yardley, Pa.

[73] Assignee: General Electric Company, East Windsor, N.J.

[21] Appl. No.: 535,676

[22] Filed: Jun. 11, 1990

Related U.S. Application Data

[63] Continuation-in-part of Ser. No. 459,863, Jan. 2, 1990, abandoned.

[51] Int. Cl.[5] .......................................... H02M 3/335
[52] U.S. Cl. ....................................... 363/89; 363/127
[58] Field of Search ................... 363/41, 89, 97, 127; 323/282, 283, 284, 285

[56] References Cited

U.S. PATENT DOCUMENTS

| | | | |
|---|---|---|---|
| 3,241,035 | 3/1966 | Rhyne, Jr. | 363/89 |
| 3,313,996 | 4/1967 | Lingle | 363/89 |
| 4,323,962 | 4/1982 | Steigerwald | 363/127 |
| 4,399,499 | 8/1982 | Butcher et al. | 363/127 |
| 4,495,554 | 1/1985 | Simi et al. | 363/21 |
| 4,519,024 | 5/1985 | Federico et al. | 363/127 |
| 4,635,179 | 1/1987 | Carsten | 363/126 |
| 4,709,316 | 11/1987 | Ngo et al. | 363/21 |
| 4,716,514 | 12/1987 | Patel | 363/89 |
| 4,819,147 | 4/1989 | Bingham | 363/127 |

FOREIGN PATENT DOCUMENTS 55-109174 8/1980 Japan.
734576 5/1980 U.S.S.R.

Primary Examiner—Peter S. Wong
Attorney, Agent, or Firm—William H. Meise

[57] ABSTRACT

A high efficiency, regulated DC supply combines the rectifying and a series regulating elements into one device such as a MOS FET which is gated "on" or "off" by the polarity of an AC voltage from a transformer winding. During the "on" state of the MOS FET a feedback network varies the MOS FET gate voltage as necessary to provide regulation of the DC output voltage during the "on" period.

4 Claims, 2 Drawing Sheets

HIGH EFFICIENCY, REGULATED DC SUPPLY

This is a Continuation-In-Part of application Ser. No. 07/459,863 filed Jan. 2, 1990, now abandoned.

This invention relates to a regulated DC supply and, more particularly, to a regulated DC supply utilizing a MOS FET as a combination rectifier/regulator element.

BACKGROUND OF THE INVENTION

The usual approach to providing a regulated DC output from an AC source is to rectify the AC from the secondary side of a transformer energized from an unregulated AC voltage. Rectification of the input AC is either by a half or full wave rectifier or by a full wave bridge with the rectified AC being filtered to remove any remaining AC components. The resulting unregulated DC voltage is then passed through a dissipative regulator with the regulator being controlled from a feedback network as the regulated output DC voltage varies with load.

Regulated DC power supplies of this sort are of course subject to the losses inherent in the voltage drops in the semiconductor rectifiers and in the regulating element. In high power and high voltage regulated DC outputs, these losses, although undesirable, are not critical. Semiconductor devices such as large scale integrated circuits (VLSI) or other semiconductor circuits such as TTL logic or the like require relatively small positive DC drive voltages, in the range of 10 volts or less and preferably plus 5 volts or less. One fundamental problem with power supplies of the type described above results from the forward junction diode voltage drops in the semiconductor diode rectifiers, about 0.7 volts or more in silicon diodes. Thus for a peak input AC in the range of five volts or below, the output DC voltage is reduced by anywhere from 0.7 to 1.0 volts or more because of the rectifiers losses. Consequently, there are undesirably large power losses in low level DC power supplies when such conventional circuits are used.

A need therefore exists for regulated DC voltage supplies in the range of five volts or less in which the losses associated with the normal diode rectification portion of the power supply is eliminated or minimized.

Applicant has found that this highly desirable result may be achieved by combining the rectifying elements and a series regulating element into one device, preferably a low loss MOS FET type transistor which is gated on and off by the AC voltage from a transformer secondary. A feedback loop responding to any changes in the regulated output DC voltage varies the gate voltage of the MOS FET to regulate the current flow to maintain the DC output voltage constant.

OBJECTIVES

It is therefore, a principal objective of the invention to provide a low voltage, regulated, DC supply in which rectification losses are minimized.

A further objective of the invention is to provide a low voltage, regulated, DC supply in which separate rectifying diodes and the losses associated therewith are eliminated.

Still another objective of the invention is to provide a low voltage, regulated, DC supply in which the rectifying and series regulating elements are combined into a single low loss device.

Other objectives and advantages of the invention will become apparent as the description thereof proceeds.

SUMMARY OF THE INVENTION

The various objectives and advantages of the invention are realized in a regulated DC power supply in which the rectifying and series regulating element are integrated into one device such as an N channel MOS FET. The source of the MOS FET transistor is connected to the secondary winding of a transformer and is gated "on" or "off" by the presence or absence of an AC winding voltage of the proper polarity. An integrator is coupled to the output terminal at which the regulated direct voltage is generated, for integrating the current from the FET to produce the direct voltage. The gate of the MOS FET is controlled from a feedback network in which an operational amplifier samples the regulated DC output and compares it to a reference voltage in order to produce an error signal to vary the MOS FET gate voltage relative to its source, to maintain the proper differential voltage across the source-to-drain for regulation. A switch is coupled to the transformer and to the control electrode arrangement of the FET for applying voltage to the control electrode arrangement during a portion of the cycle of AC for disabling the controlled current path of the FET during that portion of the cycle. In this fashion, a MOS FET device provides both the rectification and series regulation functions.

DETAILED DESCRIPTION OF THE INVENTION

Figure 1:
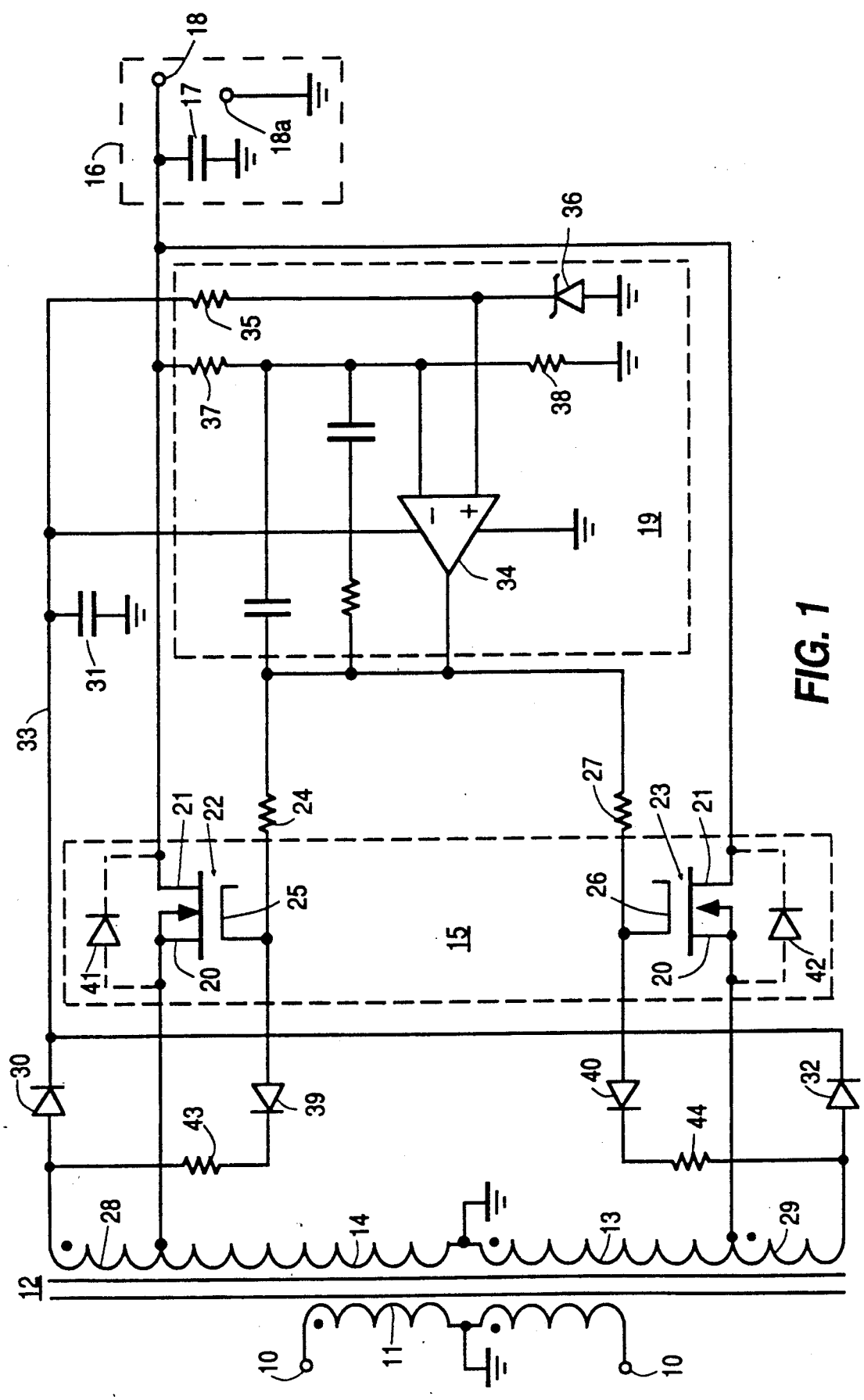
FIG. 1 is a schematic circuit diagram of the regulated DC supply showing the MOS FET rectifier/regulator and the feedback path.

FIG. 1 illustrates the low voltage, regulated DC power supply of the invention incorporating a rectifier/regulator MOS FET, with the MOS FETs being controlled by a feedback network as the output DC voltage varies. An AC signal is applied to the input terminals 10 connected to the primary 11 of transformer 12. Secondary windings 13 and 14 provide the input to a rectifier/regulator network 15, the output of which is coupled to a power supply output circuit 16. Power supply output circuit 16 consists of a storage capacitor 17 and output terminals 18 and 18a. A feedback control network 19 produces control signals for the rectifier/regulator MOS FET elements forming part of network 15. The input to feedback control network 19 is from the power supply output circuit 16. Feedback control network 19 compares a sample of the output voltage to a reference voltage, to produce an error signal for varying the series regulator condition in response to variation of the regulated DC output voltage.

Secondary windings 13 and 14 have their non-grounded terminals connected to the source electrodes 20 of a pair of N-channel MOS FET rectifier/regulators 22 and 23. The drain electrodes 21 of the MOS FETs are connected to storage capacitor 17 at the output of the power supply to provide the regulated DC voltage at output terminal 18. MOS FET transistors 22 and 23 are gated "on" or "off" by the presence or absence of a positive voltage on their associated secondary windings. Thus if winding 14 is positive with respect to ground, source electrode 20 of MOS FET 22 is rendered positive with respect to its drain electrode 21. Because the voltage applied to gate 25 of FET 22 is more positive than the voltage at its source 20 by virtue of the output of operational amplifier 34 in feedback control network 19, MOS FET 22 conducts between source and drain, thereby rectifying the positive half cycle of the AC voltage. When upper winding 14 is positive, it will be seen that the lower ends of windings 13 and 29 are negative with respect to ground, as shown by the black dot at their terminals. When the lower ends of windings 13 and 29 are negative, MOS FET 23 is in a nonconducting condition because its gate voltage is negative relative to the source of virtue of the negative bias voltage applied through diode 40 connected to the lower end of auxiliary winding 29. Gate electrodes 25 and 26 of the MOS FETs are in turn connected by way of resistors 24 and 27 to the output of series regulating network 19, so that the magnitude of the positive voltage on the gate electrode of the conducting MOS FET and hence the degree of conductivity of the conducting MOS FET is controlled from network 19. Consequently, MOS FETs 22 and 23 function both as rectifying elements and as series regulating elements.

Auxiliary windings 28 and 29, which are associated with secondary windings 14 and 13, respectively, provide supply voltages for comparator circuit 19. A diode 30 is connected in series with auxiliary winding 28 and is poled to conduct during positive alternations and supplies current which charges storage capacitor 31 toward a positive voltage equal to the peak voltage on winding 28. Similarly, diode 32 associated with auxiliary winding 29 is poled as to conduct during the negative half cycle of the AC input voltage, during which the lower end of winding 29 is positive, to supply current over line 33 to capacitor 31. The voltage across capacitor 31 is utilized to energize the reference voltage source coupled to one input of a comparator amplifier 34 forming part of feedback network 19. The reference voltage source includes a voltage divider consisting of a resistor 35 and a zener diode 36 connected in parallel with capacitor 31, with the junction of resistor 35 and zener diode 36 being connected to the noninverting (+) input terminal of amplifier 34. The output of amplifier 34 is connected to the gate electrodes of the MOS FETs by way of resistors 24 and 27.

The inverting (−) input terminal of amplifier 34 is connected to the junction of a voltage divider which samples the DC output voltage. The voltage divider, consisting of resistors 37 and 38, is connected between output terminal 18 and ground so that the voltage at the junction of resistors 37 and 38 varies as the DC output voltage of the power supply varies. That is, with the DC output voltage at the regulated value, the voltage at the junction of resistors 37 and 38 as compared to the reference voltage at the junction of resistors 35 and zener diode 36 is such that the output control voltage from comparator amplifier 34 of the feedback network maintains the gate voltage of the MOS FET at a level such that a current flow through the MOS FETs to storage capacitor 17 maintains the DC output voltage at the desired level. If the voltage at output terminal 18 tends to drop, the voltage at the junction of resistors 37 and 38 drops correspondingly and the input voltage to the inverting terminal becomes more negative or decreases, thereby increasing the output signal from amplifier 34 in a positive direction, causing the current flow through the MOS FET which is conducting at the time to increase, thereby restoring or tending to increase the voltage at the output terminals. Similarly, should the voltage at the output terminals tend to rise, the input voltage to the comparator amplifier 34 rises relative to the reference voltage, thereby decreasing the output voltage to the gate of the MOS FET then conducting, and reducing the current flow therethrough, causing the voltage across capacitor 17 and output terminal 18 to fall or be restored to the desired level.

Diodes 39 and 40 are connected through resistors 43 and 44 to form diode-resistor pairs, which are connected between the ends of auxiliary windings 28 and 29 and gates 25 and 26, respectively. These diodes are so poled that when their associated auxiliary winding is positive, this positive voltage is blocked from the gate so that only the output voltage from the comparator amplifier 34 controls the conduction of the MOS FET. However, when the polarity reverses, as for example when the dotted end of auxiliary winding 28 goes negative, its associated diode 39 becomes conductive and applies a negative voltage which is larger in magnitude than the negative voltage applied to source 20 during the negative half cycle. Therefore, these diodes conduct during the off half cycles to turn the MOS FETS off whenever the polarity of the auxiliary winding voltage switches.

Figure 2:
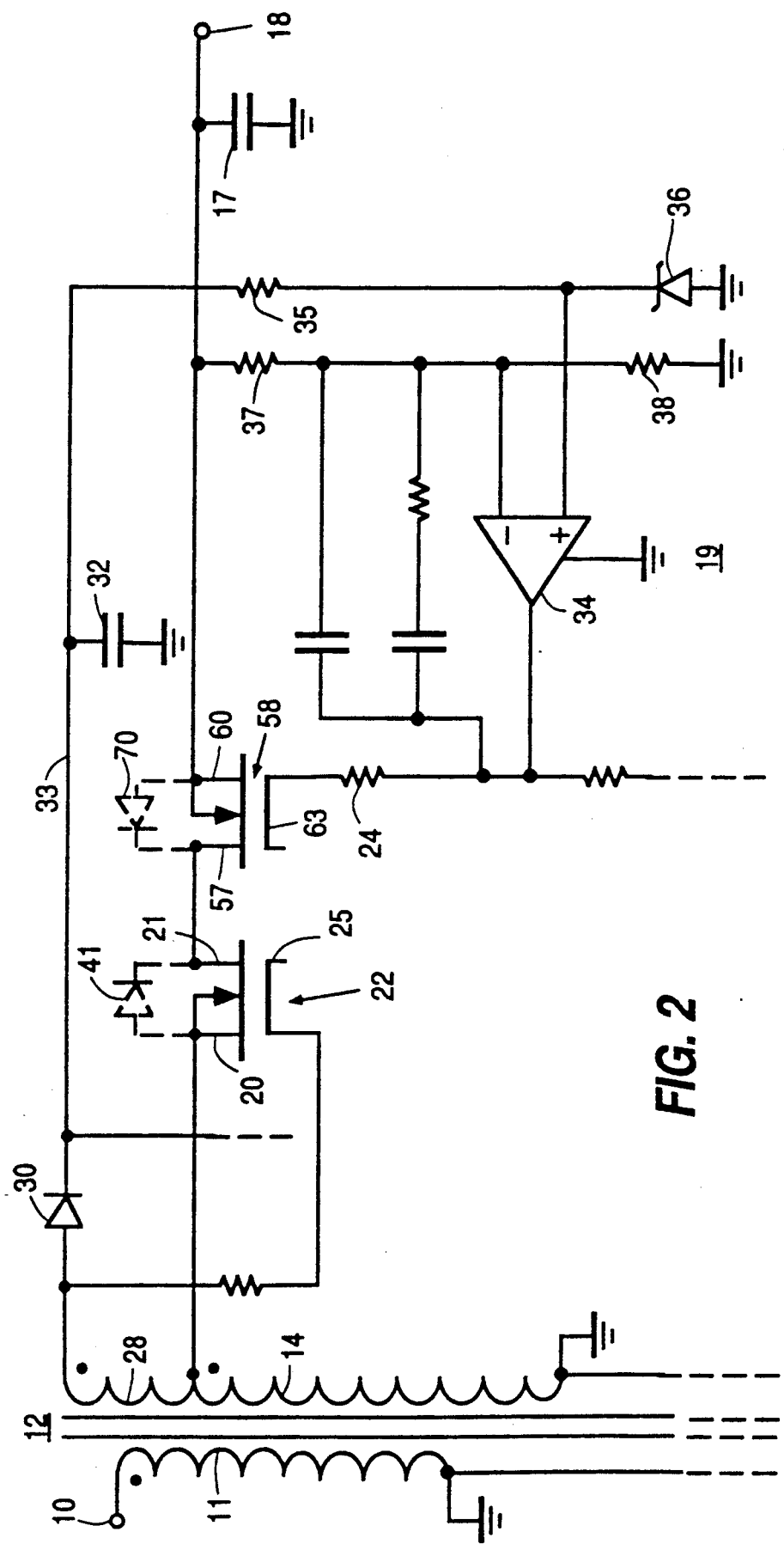
FIG. 2 is a partial circuit diagram showing a modification of FIG. 1 in which two MOS FET transistors are connected in series to increase the regulation range of the circuit.

The intrinsic diodes of the individual MOS FETs, which diodes are inherent in the MOS FET structure across the source and drain, are shown at 41 and 42 by means of dashed lines. The intrinsic diode of a MOS FET has its anode connected to the source and the cathode connected to the drain and limits the regulation range of the circuit to the forward breakdown voltage of the diode (approximately 0.7 volts). If additional or increased regulation range is desired, this can be achieved by a series connection of two MOS FET transistors with a source terminal of the first connected to the transformer secondary and the source terminal of the second connected to the output, i.e. the two MOS FETs are connected drain to drain. This arrangement is shown in FIG. 2 which shows one half of the full wave rectification regulation arrangement of FIG. 1 but with two MOS FETs connected in series to increase the regulation range. Elements of FIG. 2 corresponding to those of FIG. 1 are designated by the same reference numerals.

Thus, FIG. 2 shows an input terminal 10 to one half of the primary winding 11 of a transformer 12. Transformer 12, as described in connection with FIG. 1, is centered tapped and grounded, with only secondary winding 11 and auxiliary winding 28 being shown. Secondary winding 14 is connected to the source electrode 20 of MOS FET 22, the drain electrode 21 of which is connected to the drain electrode 57 of a second MOS FET 58. The source electrode 60 of MOS FET 58 is connected to storage capacitor 17 and output terminal 18. In the arrangement of FIG. 2, MOS FET 22 is used as the rectifying device with MOS FET 58 being used as the regulating element. To this end, the gate electrode 25 of MOS FET 22 is connected to auxiliary winding 28 so that during a positive voltage on the secondary and auxiliary windings, the gate voltage on MOS FET 22 is more positive than the positive voltage on its source electrode 20, causing the device to conduct to thereby rectify the positive AC half cycle voltage. Gate electrode 63 of MOS FET 58 is connected by way of a resistor 24 to the output of a comparator amplifier 34 forming part of a feedback network 19 identical to that shown in FIG. 1. That is, in the configuration of FIG. 2, two MOS FETs are connected drain-to-drain in each leg of the push pull secondary output. The intrinsic diodes 41 and 20 of the MOS FET pair are connected cathode-to-cathode. This prevents current conduction in the series connected pair of MOS FETs when the gates are biased off.

In operation of the arrangement of FIG. 2, the MOS FET 22 acts as an off-on-gate and the second MOS FET 58 acts as the regulating element. When the transformer secondary voltage is positive, MOS FET transistor 22 is biased full-on to rectify the AC and MOS FET 58 absorbs the differential voltage between the transformer and the output. When the secondary is negative, MOS FET transistor 22 is switched off by virtue of its connection to auxiliary winding 28, thereby preventing conduction through the transistors intrinsic diode in the forward direction.

It will be apparent that only the upper half of a full wave DC regulated power supply shown in FIG. 2 and that a circuit arrangement identical to the one shown in FIG. 2 would be present in the other secondary winding of the transformer.

It will now be apparent that a low voltage, regulated, DC power supply has been described which is highly efficient because the normal losses associated with the use of rectifying diodes in combination with series regulating dissipative elements are eliminated since a low loss MOS FET device is utilized both as the rectifying and series regulating element.

What is claimed is:

1. A power supply for converting cyclic alternating voltage from a two-phase source with a reference potential, into a regulated direct voltage at an output terminal, comprising:

first field-effect transistor means including a controlled current path extending between source and drain electrodes, and also including a control electrode arrangement, one of said source and drain electrodes of said first field effect transistor means being adapted to be coupled to a first phase of said source of alternating voltage, the end of said controlled current path, which end is remote from said one of said source and drain electrodes which is adapted to be coupled to said source of alternating voltage, being coupled to said output terminal, for controllably conducting current to said output terminal;

integrating means coupled to said output terminal and to said reference potential for integrating said current to produce said direct voltage;

first switching control means coupled to said first phase of said source of alternating voltage and to said control electrode arrangement of said first field-effect transistor means for applying voltage to said control electrode arrangement of said first field-effect transistor means during a portion of the cycle of said alternating voltage for disabling said controlled current path of said first field effect transistor means during said portion of the cycle;

second field-effect transistor means including a controlled current path extending between source and drain electrodes, and also including a control electrode arrangement, said one of said source and drain electrodes of said second field-effect transistor means being adapted to be coupled to said second phase of said source of alternating voltage, at the end of said controlled current path of said second field-effect transistor means, which end is remote from said one of said source and drain electrodes which is adapted to be coupled to said source of alternating voltage, being coupled to said output terminal, for controllably coupling current to said output terminal.

second switching control means coupled to said second phase of said source of alternating voltage and to said control electrode arrangement of said second field-effect transistor means for applying voltage to said control electrode arrangement of said second field-effect transistor means during another portion of said cycle of said alternating voltage for disabling said controlled current path of said second field-effect transistor means during said other portion of the cycle; and feedback control means coupled to said output terminal and to said control electrode arrangements of said first and second field effect transistor means for comparing said direct voltage with a reference voltage to generate an error signal, and for coupling said error signal to said control electrode arrangements in a degenerative manner for controlling the conduction of said controlled current paths, during those portions of said cycle in which said controlled circuit paths are not disabled, in a manner tending to maintain said direct voltage near a particular value.

2. A supply according to claim 1 wherein:
said one of said source and drain electrodes is said source electrode, and wherein said drain electrodes are coupled to said output terminal;

said feedback control means comprises amplifying means including a single output terminal arrangement, said output terminal arrangement being coupled to said control electrode arrangements of said first and second field effect transistor means;

said first switching control means comprises a first source of pulsatory voltage synchronous with said first phase of said alternating voltage, and said second switching control means comprises a second source of pulsatory voltage synchronous with said second phase of said alternating voltage.

3. A supply according to claim 2 wherein:
said source of alternating voltage is a transformer secondary winding;

said first source of pulsatory voltage includes a further secondary winding of said transformer, and first rectifying means coupled between said further secondary winding and said gate electrode arrangement of said first field-effect transistor means.

4. A supply according to claim 1 wherein:
said first field-effect transistor means comprises first and second field-effect transistor structures, each including source and drain electrodes, said structures being connected drain-to-drain with said controlled current path extending serially between said source electrodes of said first and second field-effect transistor structures, each of said field-effect transistor structures further including a gate electrode portion of said control electrode arrangement; and wherein said switching control means is coupled to said first field-effect transistor structure gate electrode portion of said control electrode arrangement, and said feedback control means is coupled to said second field-effect transistor structure gate electrode portion of said control electrode arrangement.

* * * * *